UNITED STATES PATENT OFFICE.

ROBERT ABBOTT HADFIELD, OF SHEFFIELD, ENGLAND.

PROCESS FOR IMPROVING THE MAGNETIC QUALITIES OF A MAGNETIC BODY.

1,082,948.

Specification of Letters Patent. Patented Dec. 30, 1913.

No Drawing. Application filed March 21, 1907, Serial No. 363,655. Renewed June 2, 1913. Serial No. 771,340.

*To all whom it may concern:*

Be it known that I, ROBERT ABBOTT HADFIELD, a subject of the King of Great Britain, of Sheffield, England, have invented a certain new and useful Improvement in Processes for Improving the Magnetic Qualities of a Magnetic Body, of which the following is a specification.

The invention is a process for improving certain magnetic qualities of a magnetic body, and more especially of alloys of iron and silicon, or iron-silicon—and aluminium or iron-silicon and manganese, in order to increase the magnetic permeability and electric resistance and lower the hysteresis action of the said body; and thus to adapt it for use in ballast-coils, transformer-plates and like electrical apparatus, where the reduction of magnetic and electric losses to the lowest possible degree is of great importance.

In U. S. Patent No. 745,829 granted to me December 1, 1903, I have set forth a process which consists in heating the magnetic body to between about 900° and 1100° centigrade, allowing it to cool, preferably quickly, then reheating it to between about 750° and 850° centigrade and thereupon allowing it to cool slowly. By my present invention, instead of cooling relatively rapidly after the first or high heating, I cool the material slowly, and, instead of cooling slowly after the second or low heating, I cool the material rapidly. Or, in other words, I first heat the magnetic body, specifically including in this term the particular alloys hereinbefore mentioned, to a temperature below its melting point, say between about 900° and 1000° centigrade, then cool it slowly, then reheat it to a lower temperature say between 700° and 800° centigrade and then cool it rapidly. By this process, I attain the desirable results hereinbefore set forth.

Cooling rapidly, as herein referred to, means cooling at such a rate as that the changes effected by raising the material to the definite temperature stated are retained substantially unaltered. Cooling slowly, as herein referred to, means cooling at such a rate as to permit the slow rearrangement of the molecules with reference to one another, so that the condition of strain or hardness is removed and the material becomes soft, often accompanied by a more uniform distribution of the elements throughout the mass.

I claim:

1. The process of reducing the total magnetic and electric loss in a magnetic body composed of iron alloyed with other elements, which consists in, first, heating said body to a temperature below its melting point, cooling slowly, then heating said body to a lower temperature, and then cooling said alloy rapidly.

2. The process of reducing the total magnetic and electric loss in an alloy containing iron and silicon, which consists in first heating said alloy to a temperature ranging from about 900° C. to about 1000° C., then cooling said alloy slowly, then reheating said alloy to a temperature ranging from 700° C. to about 800° C. and then causing said alloy to cool rapidly.

3. The herein described process of reducing the total magnetic and electric loss in a magnetic body composed of iron alloyed with other elements which consists in first heating said body to a comparatively high temperature, below its melting point, then cooling the body slowly, then reheating the body to a lower temperature than before, and then cooling said body rapidly.

4. The herein described process of reducing the total magnetic and electric loss in a magnetic body composed of iron alloyed with other elements, which consists in first heating said body to a high temperature below its melting point, then cooling said body slowly, then reheating said body to a temperature lower than about 100° C. lower than the first temperature, and then cooling said body rapidly.

5. The process of reducing the total magnetic and electric loss in a magnetic body composed of iron alloyed with other elements which consists in first heating said body to a comparatively high temperature not substantially above about 1000° C., then cooling said body, then reheating said body to a high temperature but not substantially above about 800° C. and then cooling said body much more rapidly than the first cooling.

6. The process of reducing the total magnetic and electric loss in a magnetic body composed of iron alloyed with other elements which consists in first heating said body to comparatively a high temperature of about 900° C. to about 1000° C. then cooling said body slowly as to permit the slow rearrangement of the molecules so that the condition of strain or hardness is removed and the material becomes soft, then reheating said body to a lower temperature of about 700° C. to about 800° C. and then cooling said body rapidly to retain substantially unaltered the changes effected by raising the material to said temperature.

7. The herein described process of producing a magnetic material of high permeability and low hysteresis action which consists in alloying iron with silicon and with another material then heating said body to a high temperature but below its melting point, then cooling slowly, then heating said body to a high temperature but lower than the preceding and then cooling the same rapidly.

8. The herein described process of producing a magnetic material of high permeability and low hysteresis action which consists in alloying iron with silicon and with another material such as aluminium and phosphorus, then heating said alloy to a temperature of from about 900° C. to about 1000° C., then cooling said alloy slowly, then reheating said alloy to a temperature of from about 700° C. to about 800° C. and then cooling said alloy rapidly.

In witness whereof, I have signed my name hereto in the presence of two witnesses.

ROBERT ABBOTT HADFIELD.

Witnesses:
 WILLIAM CROSS,
 JOHN WM. CRAWLEY.